United States Patent
Patel et al.

(10) Patent No.: US 9,600,332 B2
(45) Date of Patent: Mar. 21, 2017

(54) SERVER LOAD BALANCING BASED ON VIRTUAL UTILIZATION, PHYSICAL UTILIZATION, AND FEEDBACK

(75) Inventors: Alpesh S. Patel, Morrisville, NC (US); Chris O'Rourke, Apex, NC (US); Udayakumar Srinivasan, Fremont, CA (US); Mark Albert, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 762 days.

(21) Appl. No.: 12/431,546

(22) Filed: Apr. 28, 2009

(65) Prior Publication Data

US 2010/0274890 A1    Oct. 28, 2010

(51) Int. Cl.
  G06F 15/173   (2006.01)
  G06F 9/48    (2006.01)
  H04L 12/803   (2013.01)
  H04L 12/26    (2006.01)
  G06F 9/50    (2006.01)

(52) U.S. Cl.
  CPC .......... *G06F 9/4862* (2013.01); *G06F 9/5083* (2013.01); *H04L 43/08* (2013.01); *H04L 47/125* (2013.01)

(58) Field of Classification Search
  CPC ..... H04L 47/125; H04L 43/08; G06F 9/4862; G06F 9/5083
  USPC ......................................................... 709/224
  See application file for complete search history.

(56) References Cited

U.S. PATENT DOCUMENTS

| | | | |
|---|---|---|---|
| 7,203,944 B1 * | 4/2007 | van Rietschote et al. .... | 718/104 |
| 7,383,405 B2 * | 6/2008 | Vega et al. .................... | 711/162 |
| 7,689,660 B2 * | 3/2010 | Kilian et al. .................. | 709/213 |
| 7,886,294 B2 * | 2/2011 | Dostert et al. ..................... | 718/1 |
| 8,013,859 B2 * | 9/2011 | Cannon, III .................. | 345/440 |
| 8,468,535 B1 * | 6/2013 | Keagy et al. ................. | 718/104 |
| 2005/0198303 A1 * | 9/2005 | Knauerhase et al. ......... | 709/227 |
| 2006/0143359 A1 * | 6/2006 | Dostert et al. ..................... | 711/6 |
| 2006/0185015 A1 * | 8/2006 | Cheston et al. ................ | 726/24 |
| 2006/0230407 A1 | 10/2006 | Rosu et al. | |
| 2006/0242634 A1 * | 10/2006 | Fleischer et al. ............ | 717/148 |
| 2007/0028239 A1 * | 2/2007 | Dyck .................... | G06F 9/5088 718/1 |
| 2007/0043860 A1 * | 2/2007 | Pabari .......................... | 709/224 |
| 2007/0067435 A1 * | 3/2007 | Landis et al. ................ | 709/224 |
| 2008/0104608 A1 | 5/2008 | Hyser et al. | |

(Continued)

OTHER PUBLICATIONS

PCT Search Report and Written Opinion for Serial No. PCT/US2010/032792 dated Aug. 6, 2010.

(Continued)

*Primary Examiner* — Minh-Chau Nguyen
(74) *Attorney, Agent, or Firm* — Patterson + Sheridan LLP

(57) ABSTRACT

Methods and apparatus for providing availability information of a virtual machine to a load balancer are disclosed. The availability information of the virtual machine may be normalized information from performance metrics of the virtual machine and performance metrics of the physical machine on which the virtual machine operates. The normalized availability of a virtual machine is provided by a feedback agent executing on the virtual machine. Alternatively, the normalized availability of a virtual machine is provided by a feedback agent executing on a hypervisor executing multiple virtual machines on a common set of physical computing hardware.

25 Claims, 7 Drawing Sheets

(56) References Cited

U.S. PATENT DOCUMENTS

| | | | |
|---|---|---|---|
| 2008/0107070 A1* | 5/2008 | Sastry | H04W 8/12 370/329 |
| 2008/0163207 A1* | 7/2008 | Reumann | H04L 63/0263 718/1 |
| 2008/0201455 A1* | 8/2008 | Husain | 709/220 |
| 2009/0150538 A1* | 6/2009 | Tripathi et al. | 709/224 |
| 2009/0193146 A1* | 7/2009 | Albert | G06F 9/5083 709/241 |
| 2009/0210527 A1* | 8/2009 | Kawato | 709/224 |
| 2009/0265707 A1* | 10/2009 | Goodman et al. | 718/1 |
| 2010/0131636 A1* | 5/2010 | Suri et al. | 709/224 |
| 2010/0250824 A1* | 9/2010 | Belay | 718/1 |
| 2012/0324239 A1* | 12/2012 | Falk et al. | 713/189 |
| 2013/0145072 A1* | 6/2013 | Venkataraghavan et al. | 710/316 |

OTHER PUBLICATIONS

Chen et al., "High Scalable and Available Server Environment Based on Virtual Machine," 2006 IEEE Computer Society International Conference on Hybrid Information Technology, Nov. 2006: pp. 362-371.

* cited by examiner

SERVER LOAD BALANCING BASED ON VIRTUAL UTILIZATION, PHYSICAL UTILIZATION, AND FEEDBACK

BACKGROUND

Technical Field

Embodiments described in this disclosure generally relate to methods and apparatus for load balancing in a system having one or more virtual machines. More specifically, embodiments described in this disclosure relate to methods and apparatus to get feedback information in virtual environment for server load balancing.

Description of the Related Art

A load balancer in a network makes forwarding decisions according to availability information reported by servers managed by the load balancer. Various factors can be used by the servers and load balancers in reporting load and making forwarding decisions. For example, a feedback agent running on each server may provide performance metrics to the load balancer. In turn the load balancer, uses the performance metrics to decide how to distribute multiple requests among the different servers.

In a virtual environment, servers operate on multiple virtual machines running on a physical machine. A server on a virtual machine reports performance metrics of the virtual machine to the load balancer. Because multiple virtual machines may run on a single physical machine simultaneously, the performance metrics reported by a server running on a virtual machine may not account for the all aspects of load on the physical machine. As a result, a physical machine running several virtual machines could be fully loaded while servers on each virtual machine report to the load balancer as being under loaded.

SUMMARY

Embodiments described herein relate to methods and apparatus for providing normalized availability information of one or more virtual machines. The normalized availability information of the one or more virtual machines is generated from both performance metrics of the virtual machine and performance metrics of a physical machine on which the virtual machine operates.

One embodiment comprises a system having a processor, a network interface, a memory containing a hypervisor, and a feedback agent. The hypervisor may be configured to execute a plurality of virtual machines on the first computing system. The feedback agent may be generally configured to perform an operation to monitor an availability of at least a first virtual machine, of the plurality. The operation may generally include monitoring one or more performance metrics of the first virtual machine and monitoring one or more performance metrics of the computing system. The operation may further include normalizing the one or more performance metrics of the first virtual machine based on the performance metrics of the computing system and sending, over the network interface, the normalized performance metrics of the virtual machine to a load balancer.

The load balancer may generally provide a program executing on a second computing system. The load balancer may be configured to distribute computing tasks among the plurality of virtual machines based on the normalized performance metrics. In a particular embodiment, the feedback agent is a component of the hypervisor. In such a case, the feedback agent may report performance metrics of the physical machine as well as performance metrics of each virtual machine running on the hypervisor. Alternatively, an instance of the feedback agent may be executed on each of the plurality of virtual machines. Further, the computing tasks may comprise IP network service requests. And the load balancer may be further configured to assign each request to a network connection on one of the virtual machines.

Additionally, some virtualization systems allow a virtual machine to be migrated from one physical server to another. In a particular embodiment, the load balancer may receive an indication that a virtual machine on one host (and associated network connections) is going to be migrated to another host. In such a case, the load balancer may monitor the migration that virtual machines from the originating computing system to a target computing system. The load balancer may selectively drop network traffic addressed to connections on the virtual machine while it is migrated, allowing higher layer protocols to address any dropped traffic resulting from the migration.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
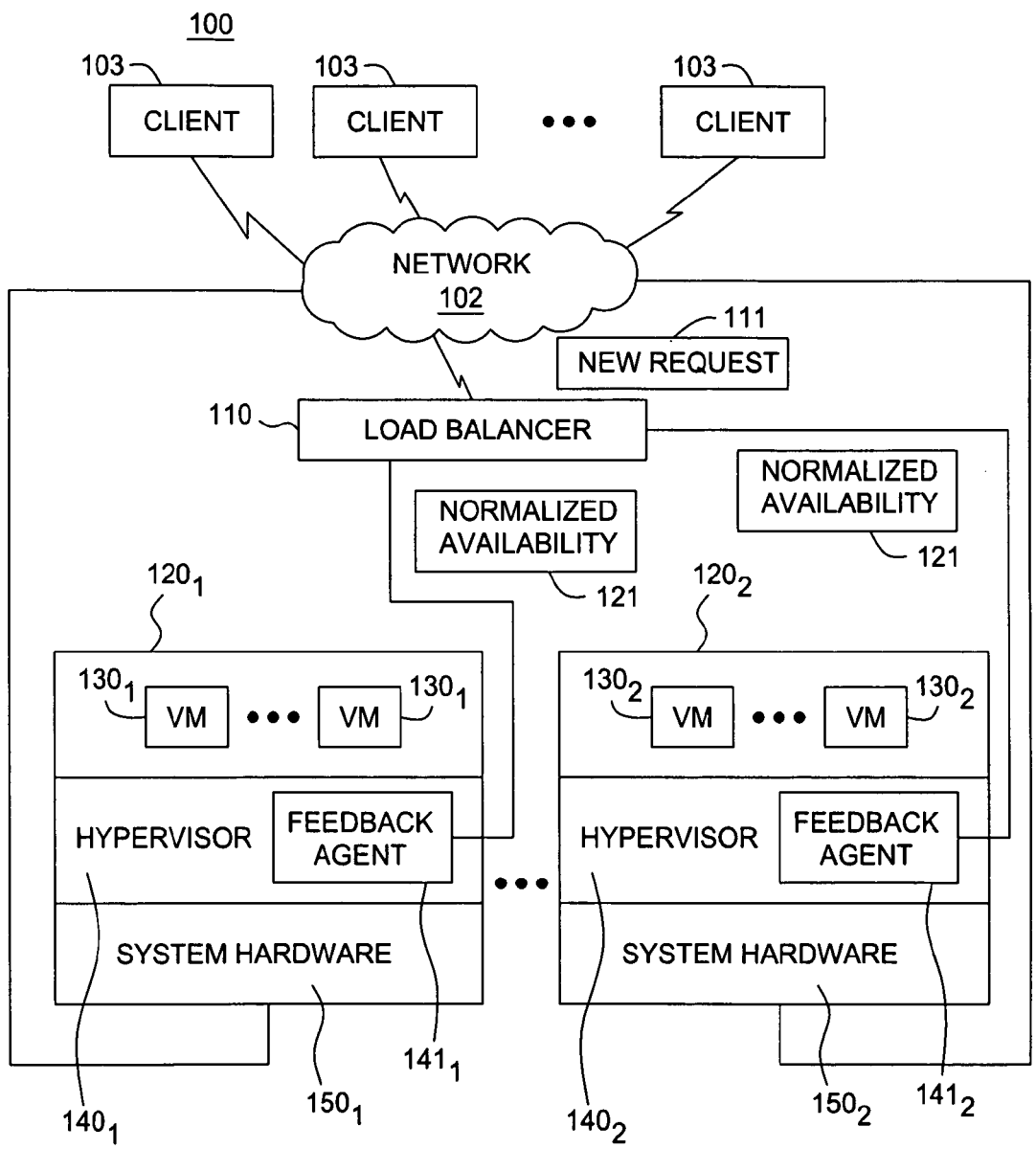
FIG. 1A is a schematic block diagram illustrating an example computing environment, according to one embodiment.

Embodiments described herein disclose methods and apparatus for providing load and performance data of a virtual machine to a load balancer. In a particular embodiment, the load and performance data of the virtual machine is normalized from performance metrics of the virtual machine and performance metrics of the physical machine on which the virtual machine operates. The normalized information allows the load balancer to make smart forwarding decisions without knowing whether the servers are running on virtual machines or physical machines.

The performance metrics of a virtual machine may include information about the loads on a virtual CPU, virtual memory, virtual network interface, virtual storage, migration status, other virtual hardware, and combinations thereof. The performance metrics of a physical machine may include information about a CPU, memory, network interface, storage, other hardware, and combinations thereof. By normalizing performance metrics for data related to loads on virtual components of a virtual machine, embodiments may be used with out any changes to the load balancer. That is, the load balancer does not need to distinguish between servers running on virtual machines and servers running on physical machines. Thus, embodiments disclosed herein can be used in load balancing among virtual machines, or load balancing among virtual machines and physical machines.

In one embodiment, the normalized availability of a virtual machine is provided by a feedback agent running on each virtual machine. The feedback agent may utilize an API provided by the virtualization software running on the virtual machine to obtain performance metrics related to system loads on the physical machine. The feedback agent then generates normalized availability information related to loads on the virtual machine from the performance metrics of both the physical machine and the virtual machine. The feedback agent then conveys the normalized availability information to the load balancer. In one embodiment, the normalized availability information may be sent using an existing protocol understood by the load balancer, therefore, no adjustment is required on the load balancer.

In another embodiment, the normalized availability of a virtual machine is provided by a feedback agent operating within a hypervisor managing the virtual machine. The hypervisor has access to performance metrics of each virtual machine. The feedback agent within the hypervisor then conveys related loads on each virtual machine to the load balancer. In one embodiment, the normalized availability information may be sent using the protocol used by the load balancer. In one embodiment, the normalized availability information of all the virtual machines running on the hypervisor is sent to the load balancer in an aggregated manner. In another embodiment, the normalized availability information of each virtual machine running the hypervisor is sent to the load balancer individually.

In yet another embodiment, migration status of a virtual machine may be provided to the load balancer. In response, e.g., the load balancer may stop forwarding traffic, or assigning new connections, to the migrating virtual machine until migration is completed. For example, the load balancer may also selectively drop any traffic addressed as going to the virtual machine being migrated until an indication is received that the migration is complete. Doing so facilitates the migration to a new physical server as upper layer protocols can adapt to the drop in packets. Since the virtual server does not receive any new packets during the migration, its state does not changes and thus it does not need to checkpoint any changes to the virtual server at the new location.

FIG. 1A is a block diagram illustrating an example computing environment 100, according to one embodiment. As shown, the computing environment 100 includes a load balancer 110 and one or more physical machines 120. Each physical machine 120 may host one or more virtual machines 130. The load balancer 110 may distribute tasks among the virtual machines 130 running on the one or more physical machines 120. Each virtual machine 130 is assigned (or is configured with a network layer address (e.g., an IP address). The load balancer 110 receives availability information 121 from each virtual machine 130 and distributes tasks among the virtual machines 130 to balance the loads on the virtual machines.

For example, in one embodiment, a feedback agent 141 running on the hypervisor 140 may be configured to provide availability information regarding the virtual machines 130 on that physical system to the load balancer 110. However, the availability information provided by the feedback agent 141 may be normalized to account for not only the loads of virtual hardware seen by each virtual machine 130 but also for the performance metrics of system hardware 150 of the physical machine 120 on which the virtual machines 130 are running.

FIG. 1A shows two physical machines $120_1$ and $120_2$ connected to the load balancer 110. However, any number of virtual hosts 130 may be connected to the load balancer 110. Further, one or more physical machines operating without virtual machines may be connected to the load balancer 110 and the load balancer 110 can be configured to distributing tasks among applications running on the virtual machines 130 and applications running on the physical machines.

The load balancer 110 is configured to distribute tasks among multiple virtual machines 130, according to availability information of different resources on each individual virtual machine. Examples of availability information includes central processing unit (CPU) loads, memory/cache usage, cache performance, network interface controller (NIC) usage, storage unit usage, or performance metrics related other hardware, as well as combinations of usage information. Also, as noted above, when one of the virtual machines 130 is being migrated from one physical host to another, the load balancer may drop any traffic addressed to a port on that host.

As shown in FIG. 1A, the load balancer 110 is connected to a network 102 which is connected with a plurality of clients 103. The load balancer may be implemented as a software application running in a computer system connected to network 102, or in other network hardware connected to network 102, such as a switch or a router configured to provide load balancing services for a server cluster. Requests 111 from the clients 103 may be routed to the load balancer 110 via the network 102. The load balancer 110 then forwards each new request to a server on an available virtual machine 130.

One application of the embodiment shown in FIG. 1A includes providing load balancing requests made to web servers running on virtual machines. For example, the load balancer 110 is shown connected to a cluster of physical machines 120. Further, multiple virtual machines 120 are shown running on each physical machine 120. Each virtual machine 130 may be running one or more web server applications. As a result, each virtual machine 130 (and each web server) shares the resources of the system hardware 150 in each physical machine 120. By running multiple virtualized computing systems on system hardware 150, the utilization of the physical machines 120 may be increased.

In operation, each IP network service request from one of the clients 103 is received by the load balancer 110. Once received, the load balancer 110 assigns the request to a connection on one of the virtual machines 130. For example, in the particular case of a web server running on the virtual machines, http requests are first received from clients 103 by the load balancer 110 and assigned to a connection with an http server process running on one of the virtual machines 130. Of course, more generally any IP network service requests may be balanced among a plurality of virtual machines 130 using the load balancing techniques disclosed herein.

The load balancer 110 monitors the availability of each virtual machine 130 using availability information received from the feedback agents 141 and selects what virtual machine to route each IP network service request based on such information. As noted above, in one embodiment, the feedback agent 141 agent may be integrated as part of the hypervisor 140. In such a case, the feedback agent 141 may provide the load balancer with status and load data for each virtual machine managed by the hypervisor 140. The load balancer 110 then forwards each new request to one of the web servers running on a target virtual machine, based in part on the feedback information provided by the feedback agent 141. The server on the target virtual machine 130 can generate a response to the request and send the response through the system hardware 150 via the network 102 to the client 103.

Figure 1B:
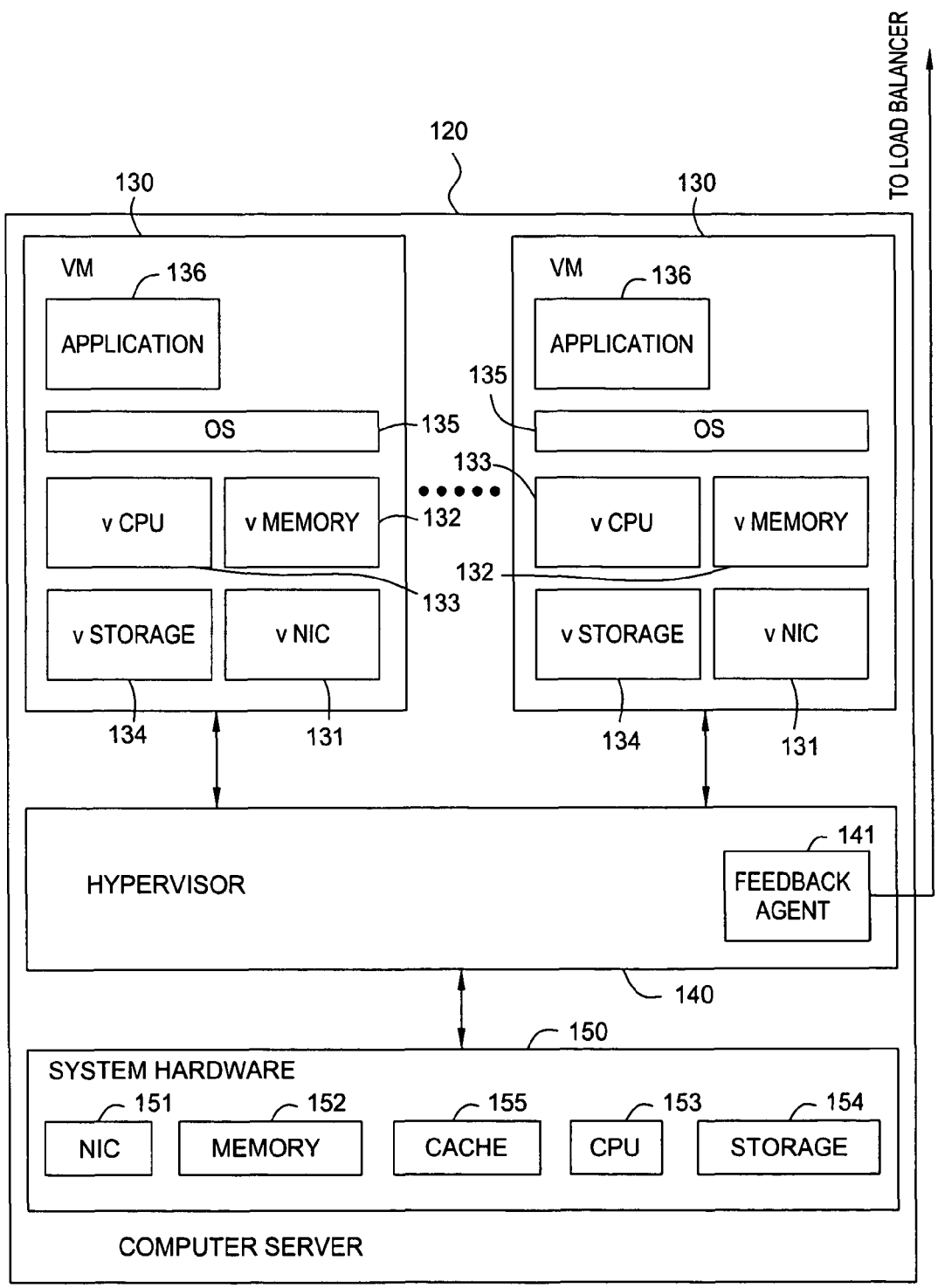
FIG. 1B is a schematic block diagram illustrating a physical machine in the computing environment of FIG. 1A, according to one embodiment.

FIG. 1B is a block diagram illustrating components of the physical machine 120 in the computing environment of FIG. 1A. As shown, the physical machine 120 generally includes a set of system hardware 150, such as a network interface NIC 151, a memory 152, a CPU 153, and a storage device 154, and a cache 155. The hypervisor 140, also known as a virtual machine monitor (VMM), generally runs over the system hardware 150 and allows the system hardware 150 to host multiple virtual machines 130. The cache 155 provides a high-speed memory accessed by the CPU 153. While memory 152 can be segmented across virtual machines cache is often shared, i.e., each virtual machine may be have a more-or-less dedicated partition of memory 152 (mapping to the virtual memory 132), the cache 155 is shared by all applications running on the physical machine 120. Thus, if a high degree of cache contention is observed, the load balancer 110 may reduce the number of requests assigned to the virtual machines 130 until the cache contention is observed to decline.

In one embodiment, the hypervisor 140 may be implemented as a software layer that runs directly on the hardware 150 intercepting some, or all, operating system calls to the hardware 150. In one embodiment, the hypervisor 140 virtualizes CPU and memory while a single privileged guest (commonly referred to as a host) is assigned to manage and virtualize network traffic and storage I/O. That is, the host (one of the virtual machines 130) is also tasked with performing as a management system for some aspects of the virtualized system. The host generally runs using a specially privileged kernel that can access hardware devices 150 and can create/destroy virtual machines (guests). Thus, multiple virtual machines 130 (guests) running on the physical machine 120 share the system hardware 150, but are not generally aware of the system hardware 150 directly. Instead, the hypervisor (and host system) 140 provides a collection of virtual hardware for each virtual machine 130. For example, as shown in FIG. 1B, each virtual machine includes a virtual CPU 133, a virtual memory 132, a virtual network interface 131, and virtual storage 134. Similarly, each virtual machine 130 runs an operating system (OS) 135 on the virtual hardware exposed by the hypervisor 140. Together, the virtual hardware and operating system 135 provide a virtualized computing platform for applications 136. Note, while these virtual hardware allocations appear distinct to the OS and applications running on each virtual machine 130, often they are either shared or contend for some shared resource below the virtualization layer. That is, the virtual resources provide an abstraction for the underlying physical resources—and the underlying physical resources are shared among the virtual machines 130. Examples of this include a memory bus, L1/L2 cache, and physical network interfaces (e.g., NIC 151), etc.

As shown in FIG. 1B, the feedback agent 141 is integrated with the hypervisor 140. In one embodiment, the hypervisor 140 may be configured to generate normalized availability information regarding the status and loads of each virtual machine 130 and provide this information to the load balancer 110. As a virtual machine monitor, the hypervisor 140 has access to performance metrics of each virtual machine 130. Further, as the hypervisor 140 runs directly on the system hardware 150, the hypervisor 140 also has access to performance metrics of the physical machine 120. Accordingly, the feedback agent 141 can monitor performance metrics of both the physical machine 120 and each virtual machine 130. Further, the feedback agent may report on the availability of a given virtual machine 130, taking into account both the availability of the physical machine 120 and the availability of the given virtual machine 130. That is, the feedback agent 141 running on the hypervisor 140 may provide the load balancer 110 with information regarding each virtual machine executing over hypervisor 140. However, because the hypervisor 140 can monitor actual loads on system hardware 150 as well as loads on the virtual devices, (e.g., virtual CPU 133), the hypervisor can provide the load 110 balancer with more useful information about the status and loads being experienced on the virtual machines 130. In turn, this allows the load balancer 110 to make better balancing decisions when distributing work requests to a cluster of virtualized systems (i.e., to the virtual machines 130).

Figure 1C:
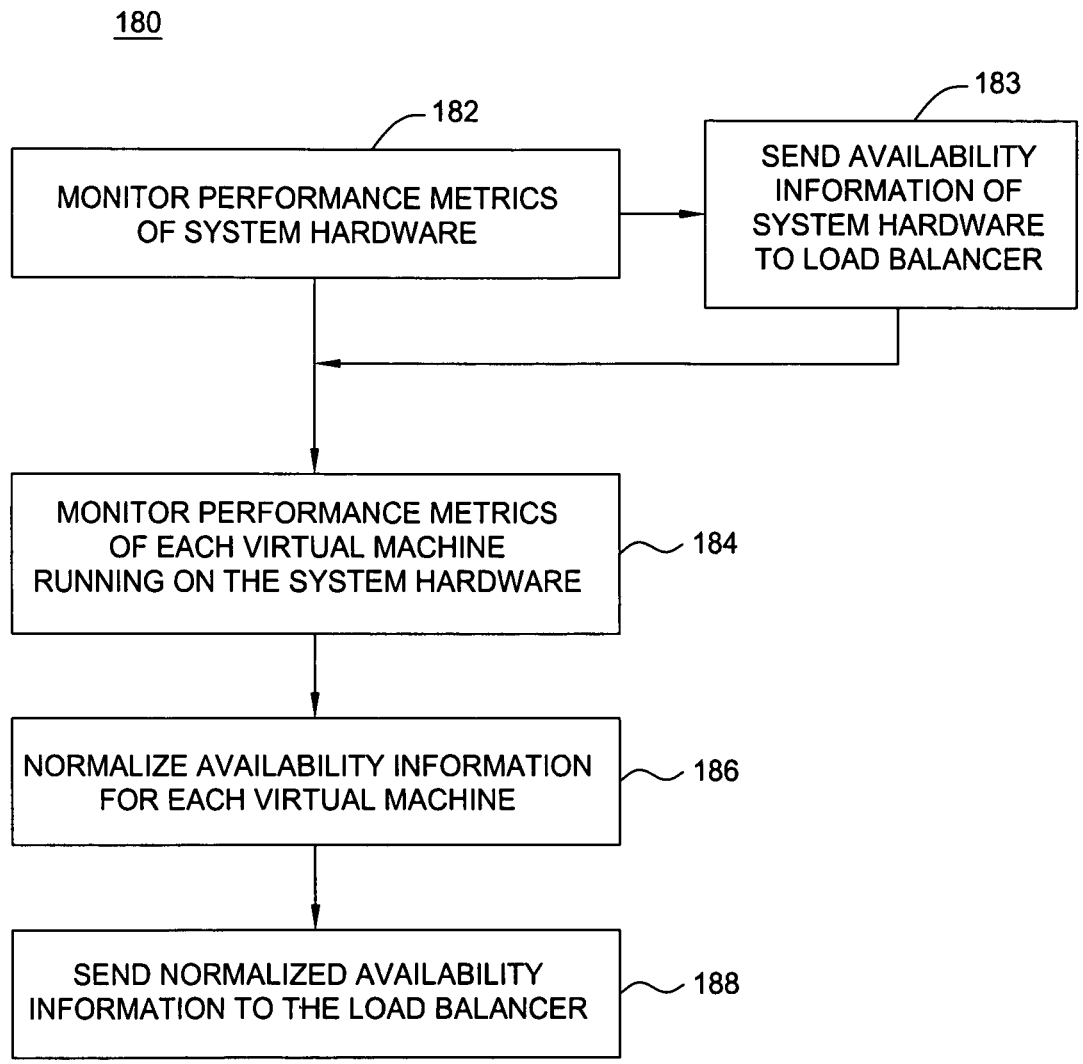
FIG. 1C is a flow chart illustrating a method for providing availability information of a virtual machine to a load balancer, according to one embodiment.

FIG. 1C is a flow chart illustrating a method 180 for a feedback agent 141 to provide availability information of a virtual machine to a load balancer 110, according to one embodiment. The method 180 may be performed periodically to provide the load balancer 110 with updated availability information of the virtual machines 130.

As shown, the method begins at step 182, where performance metrics of the system hardware 150 are monitored. In one embodiment, the performance metrics of the system hardware 150 may be obtained. For example API calls provided by the hypervisor 140 may be used to obtain load and status information such as (e.g., CPU loads, memory usage, I/O operations, network congestion, etc.) regarding the system hardware 150.

Optionally, at step 183, the performance metrics of the system hardware 150 may be reported to the load balancer 110. In such a case, the feedback agent 141 running as part of the hypervisor 140 provides the load balancer 110 with a direct view of the system hardware 150 to allow better virtual environment management. For example, the feedback agent 141 can provide available network bandwidth of the physical machine 120 for related applications to avoid, e.g., oversubscription of the NIC.

At step 184, load and status information regarding the performance of individual virtual machines 130 may be monitored. The performance metrics of each virtual machine 130 may be obtained from the hypervisor 140. For example, the feedback agent 141 may invoke API calls provided by the hypervisor 140 to obtain load and status information (CPU loads, memory usage, I/O operations, network congestion, etc.) related to the virtual hardware devices exposed to each virtual machine 130. In one embodiment, a migrating status of a virtual machine 130 being migrated from one physical system to another may also be monitored.

At step 186, the performance metrics of an individual virtual machine 130 is normalized to account for the performance metrics of the physical machine 120 on which the virtual machine 130 is running. The formula for generating normalized availability information can be customized according to the server applications and tasks running on the virtual machines 130. For example, a normalized availability of a virtual machine could be the lower of two availability metrics, the first calculated by the virtual machine based on session counts (i.e., requests assigned to that machine) and CPU utilization, and the second metric from the hypervisor could be used to account for memory bus utilization, network utilization and cache contention (which impacts data access times). In cases where a virtual machine is migrating form one physical host to another, the availability or load and status information of that machine may be set to a value that effectively represents a machine status of "not available."

For example, assume that a physical server has 8 GB RAM and a 2.0 GHz processor with two processing cores (resulting in ~4 GHz processing power). One reasonable virtual server configuration is to provide 1 GB RAM to each virtual machine, allowing eight identical virtual servers to be configured. In such a case, then the weighted average of resources available to a server is 1 GB RAM (1/8) and 512 MHz of processing power (4000 Mhz/8). Note that this is a raw approximation only. Similarly, if the physical server has a 1 Gb network interface and there are 8 servers, each having 1 GB virtual network interface, then each server is in effect getting 1 Gb/8=128 Mb link or about a 100 Mb throughput.

At step 188, the normalized availability information of each virtual machine 130 is sent to the load balancer 110. The normalized availability information may be sent using various load balancing protocols, such as DFP (dynamic feedback protocol) or KALAP (KeepAlive-Access Protocol), among others, and the normalized availability information may be packaged using such protocols, as appropriate for a particular load balancer 110.

In one embodiment, the load balancer 110 may not recognize that the virtualized systems are, in fact, virtualized. In such a case, the load balancer 110 may view each of the virtual machines 130 as an independent physical machine. However, as the load balancing information has been normalized prior to being sent to the load balancer 110, balancing decisions may be made based on the actual loads experienced by the physical systems underlying a given virtual machine. Alternatively, the normalized availability information of each virtual machine 130 running the hypervisor 140 is sent to the load balancer 110 individually. In such a case, the load balancer 110 may be configured to make load balancing determinations based on the feedback reported by each virtual machine individually as well as the feedback related to the overall performance on the server hosting the virtual machines.

Figure 2A:
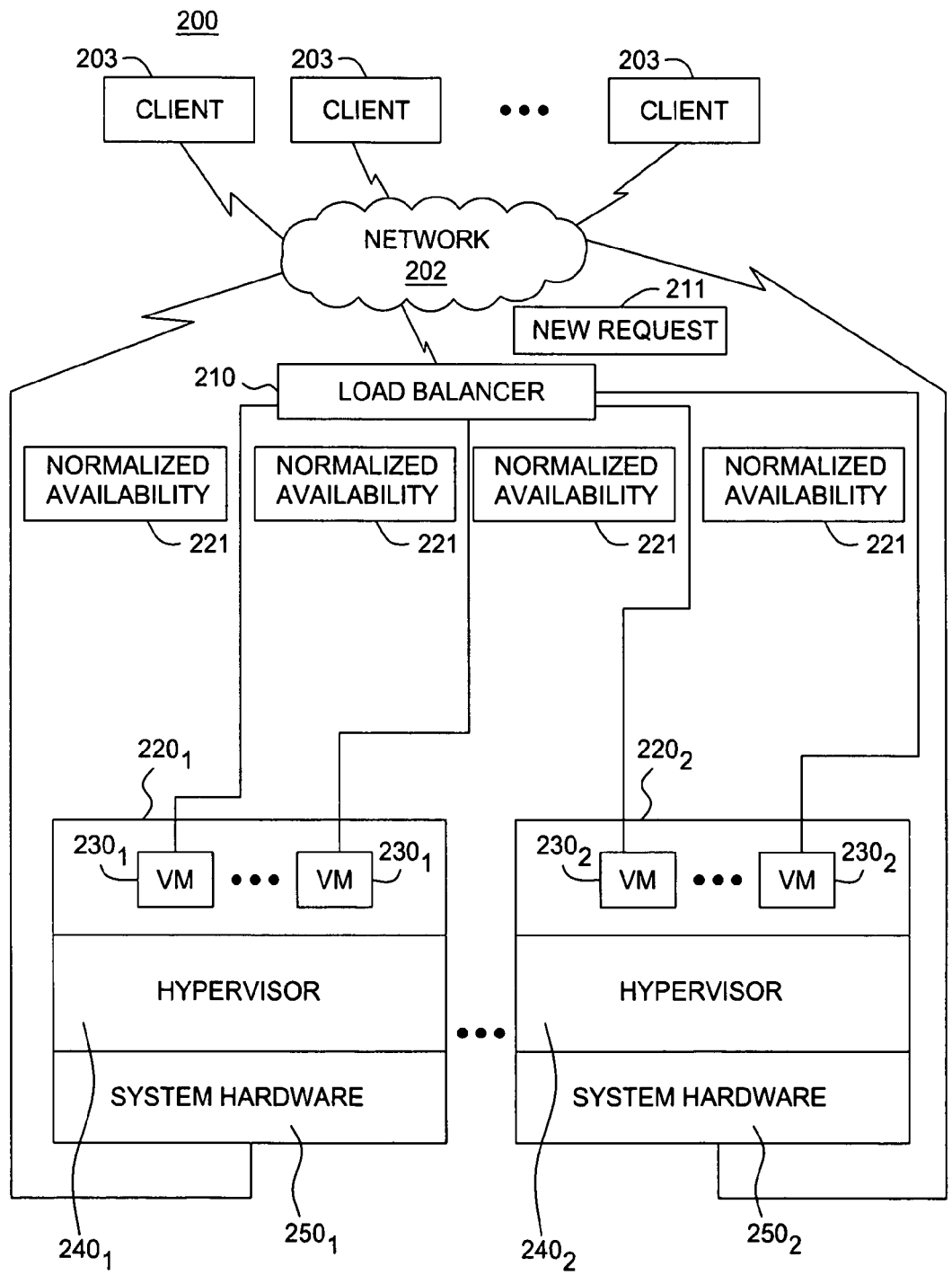
FIG. 2A is a schematic block diagram illustrating an example computing environment, according to one embodiment.

FIG. 2A is a schematic block diagram illustrating an example computing environment 200, according to one embodiment. Like computing environment 100 of FIG. 1A, computing environment 200 includes a load balancer 210 and one or more physical machines 220 each configured to host one or more virtual machines 230. The load balancer 210 is configured to distribute tasks among the virtual machines 230 running on the one or more physical machines 220. The load balancer 210 receives availability information 221 from each virtual machine 230 and distributes tasks among the virtual machines 230 based, at least in part, on this information. The availability information from each virtual machine 230 is provided to the load balancer 210 by a feedback agent 237 running individually on each virtual machine 230. However, before being sent to the load balancer 210, the feedback agent normalizes the availability information for a given virtual machine 230 to account for the performance metrics of system hardware 250 of the physical machine 220 on which the virtual machine 230 resides.

The load balancer 210 is configured to distribute tasks among virtual machines 230, based in part on the availability information and system loads reported by the virtual machines 230. As noted above, examples of availability information include central processing unit (CPU) loads, memory usage, network interface controller (NIC) usage, storage unit usage, etc. However, as the feedback agent 237 is motioning the virtual machine 230, the loads obtained typically relate to the loads on the virtual machine (e.g., the load on a virtual CPU), and thus may not reflect the actual loads and availability of an underlying system (or CPU) running multiple virtual machines 230.

As shown in FIG. 2A, the load balancer 210 is connected to a network 202 which is connected with a plurality of clients 203. New requests 211 from the clients 203 are routed to the load balancer 210 via the network 202. The load balancer 210 forwards each new request to a server on an available virtual machine 230 according to the received available information.

Figure 2B:
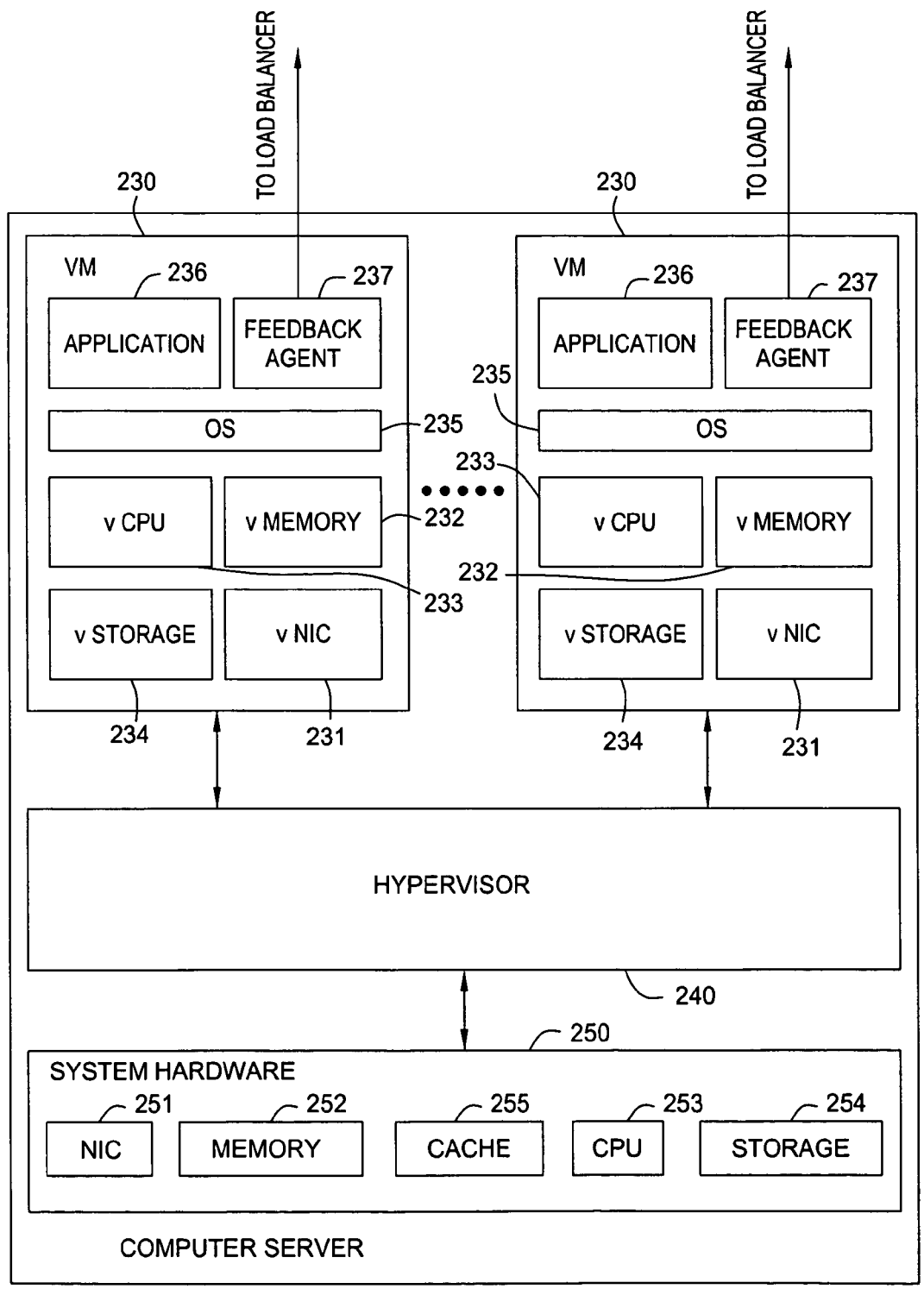
FIG. 2B is a schematic block diagram illustrating a physical machine in the computing environment of FIG. 2A.

FIG. 2B is a block diagram illustrating the physical machine 220 in the computing environment of FIG. 2A. The physical machine 220 generally includes a set of system hardware 250, such as one or more network interfaces (NIC) 251, memory 252, a CPU 253, a cache 255, and a storage device 254, etc. The hypervisor 240 generally runs on top of the system hardware 250, allowing multiple operating systems on virtual machines 230 to be spawned and executed over the system hardware 250. The hypervisor 240 may be configured to intercept some, or all, operating system calls to the hardware 250 and manage how the different virtual machines are granted access to the underlying hardware 250.

As noted above, each virtual machine 230 runs its own operating system (OS) 235 on a virtual set of hardware exposed by the hypervisor. For example, as shown in FIG. 2B, each virtual machine exposes a set of virtual hardware, such as a virtual CPU 233, virtual memory 232, a virtual NIC 231, and virtual storage devices 234. Illustratively, one or more applications 236 e.g., a set of web servers, application servers, database systems, etc.) are shown being executed by the OS 235 on the virtual hardware.

Additionally, the OS 235 on each virtual machine 230 is shown running a feedback agent 237. In one embodiment, the feedback agent 237 operates within each virtual machine 230 and provides the normalized availability information to the load balancer 210. The feedback agent 237 can query the hypervisor 240 to obtain performance metrics of the physical hardware 250 and query the OS 235 to obtain performance metrics of the virtual machine 230. The feedback agent 237 then generates a normalized the availability information of the virtual machine 230 from the performance metrics of both the physical machine 220 and the virtual machine 230. The feedback agent 237 then conveys the normalized availability information to the load balancer 210.

That is, the feedback agent 237 on a given virtual machine 230 monitors the resource loads on that virtual machine 230 and reports this information back to the load balancer 210. However, rather than simply report the load and status data of virtual system components (e.g., by reporting that a virtual CPU is under a 50% load), which could result in misleading information being provided to the load balancer 210, each feedback agent 237 may normalize the load and status data to reflect what is occurring on the system as whole.

For example, if three virtual machines 230 are each running a virtual CPU load at roughly %50—the overall load on the underlying physical machine might be at (or near) peak capacity. In such a case, if the load balancer 210 is unaware of the system virtualization, it might make load balancing decisions to send requests to each virtual server—resulting in an overloaded physical system. Instead, to complete this example, the feedback agent 237 on each of the three virtual machines may normalize the load and status information, resulting in higher loads being reported to the load balancer 210 than was actually observed by the feedback agent 237 on any of the virtual machines 230 individually. In on embodiment, the feedback agent 237 may use API calls supported by the hypervisor 240 to obtain a more accurate picture of the loads on the physical machine 220 in order to normalize loads reported the loads on the respective virtual machine 230.

Figure 2C:
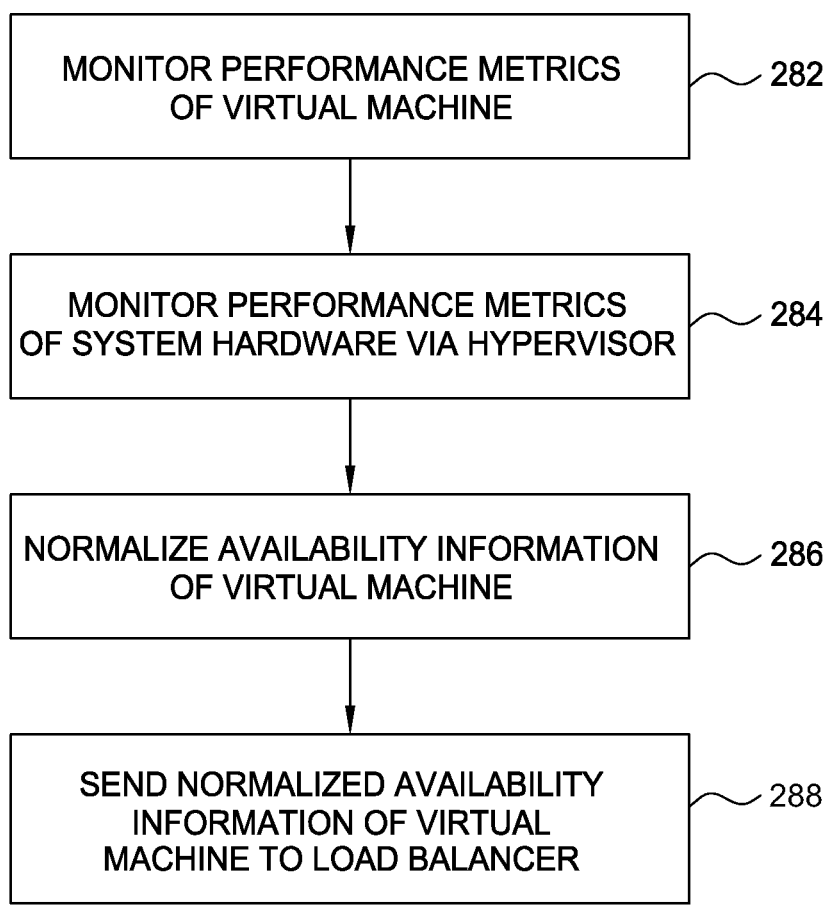
FIG. 2C is a flow chart illustrating a method for providing availability information of a virtual machine to a load balancer, according to one embodiment.

FIG. 2C is a flow chart illustrating a method 280 for a feedback agent to provide availability information for a virtual machine 230 to the load balancer 220, according to one embodiment. The method 280 may be performed periodically to provide updated availability information of the virtual machines 230. As shown, the method begins at step 282, where the feedback agent running on a given virtual machine 230 monitors performance metrics of the system hardware 250. In one embodiment, the performance metrics of the system hardware 250, such as loading, may be obtained by querying the hypervisor 240 using proprietary API or known API on the virtual machine 230. At step 284, the feedback agent 237 monitors performance metrics of individual virtual machine 230. The performance metrics of the virtual machine 230 may be obtained using proprietary API or known API on the OS 235 of the virtual machine 230.

At step 286, the performance metrics of the virtual machine 230 are modified by the performance metrics of the physical machine 220 on which the virtual machine 230 is executing to generate normalized availability information. The formula for generating normalized availability information can be customized according to applications of the virtual environment.

At step 288, the normalized availability information of the virtual machine 230 is sent to the load balancer 210. As noted above, the normalized availability information may be sent using a variety of load balancing protocols, (such as DFP (dynamic feedback protocol), KALAP, among others.

Figure 3:
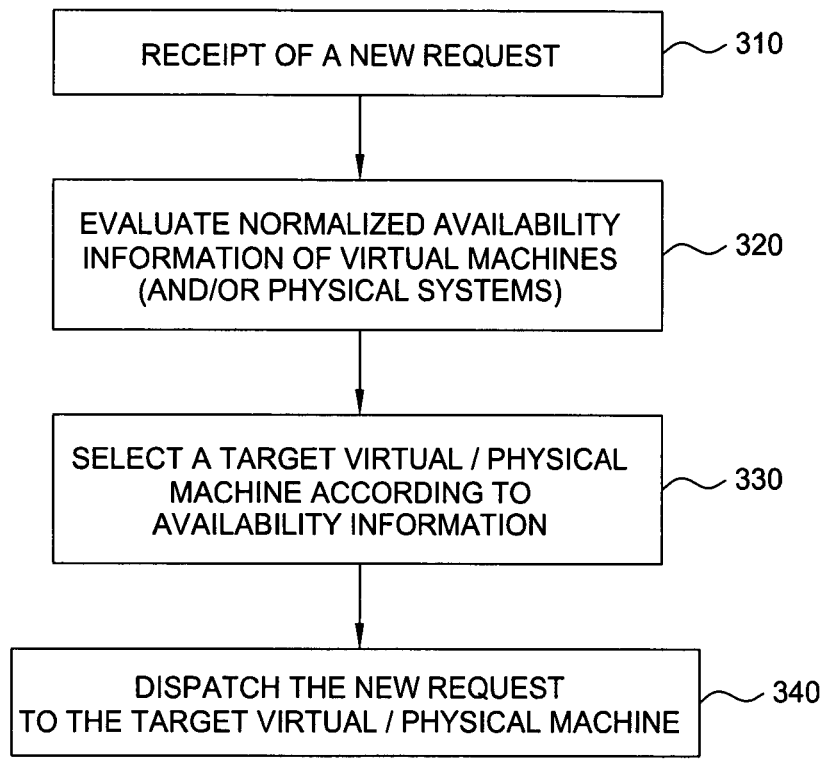
FIG. 3 is a flow chart illustrating a method for balancing load within a computing environment having one or more virtual machines.

FIG. 3 is a flow chart illustrating a method 300 for balancing application load among multiple servers in a computing environment having one or more virtual machines. The method 300 may be run in a program in a load balancer, such as the load balancer 110 of FIG. 1A and the load balancer 210 of FIG. 2A. Further, in one embodiment, the load balancer may be configured to balance load among applications running on virtual machines, physical machines, or combination of virtual machines and physical machines.

At step 310, a new request is received by the load balancer. The request may be related to any service that is distributable among applications on the virtual machines and/or physical machines connected to the load balancer, such as, e.g., a request for a web server or a query for a database. In one embodiment, the new request may be received from a network connected to the load balancer.

At step 320, the load balancer evaluates availability information of a virtual machines and/or physical machines connected in the system. In one embodiment, the load balancer does not distinguish virtual machines from physical machines. The availability information is provided by a feedback agent in each virtual/physical machine, or by a feedback agent within a hypervisor for virtual machines. In one embodiment, the availability information for virtual machines is normalized to account for both the performance metrics of the virtual hardware seen by the virtual machine and the performance metrics of the physical hardware on which the virtual machine is ran.

At step 330, the load balancer selects a target machine among the virtual machines and/or the physical machines. In one embodiment, the virtual machine/physical machine with the most available resources associated with the request is selected to be the target machine.

At step 340, the load balancer distributes the new request to the target machine. For example, the load balancer may forward the request to a sever application running on the selected virtual machine, i.e., to a port and IP address assigned to the selected virtual machine.

While the foregoing is directed to embodiments of the present disclosure, other and further embodiments of the disclosure may be devised without departing from the basic scope thereof, and the scope thereof is determined by the claims that follow.

What is claimed is:

1. A computing system of using a feedback agent to in effect augment a capability of load balancing based on virtual utilization to additionally take into account physical utilization, without requiring any change to a load balancer providing the capability, the computing system comprising:
   a computer processor;
   a network interface;
   a memory containing a hypervisor configured to execute a plurality of virtual machines on the computing system; and
   the feedback agent, which is configured to perform an operation comprising:
      generating one or more measures of virtual utilization by monitoring one or more virtual hardware components of a first of the plurality of virtual machines, the one or more measures of virtual utilization including at least one of: (i) a load on a virtualized CPU of the first virtual machine and (ii) a load on a virtualized network interface of the first virtual machine;
      generating one or more measures of physical utilization by monitoring one or more physical hardware components of the computing system and over which the one or more virtual hardware components are virtualized;
      generating one or more measures of hybrid utilization based on a predefined function including a weighted average of: (i) the one or more measures of physical utilization and (ii) the one or more measures of virtual utilization; and
      transmitting the one or more measures of hybrid utilization via the network interface to the load balancer, whereupon the load balancer distributes computing tasks among the plurality of virtual machines based on incremented one or more measures of hybrid utilization and without requiring the load balancer to have any capability of separately taking both physical and virtual utilization into account.

2. The computing system of claim 1, wherein the load balancer comprises a program executing on a second computing system, wherein the computing tasks comprise Internet Protocol (IP) network service requests, wherein the load balancer assigns each request to a network connection on a respective one of the plurality of virtual machines, wherein the one or more measures of physical utilization are greater than the one or more measures of hybrid utilization in measure, wherein the one or more measures of hybrid utilization are greater than the one or more measures of virtual utilization in measure.

3. The computing system of claim 2, wherein the load balancer monitors a migration of one of the virtual machines from the first computing system to a target computing system, wherein the load balancer selectively drops network traffic addressed to connections on the virtual machine being migrated during the migration and such as to avoid checkpointing any changes to the virtual machine at the target computing system.

4. The computing system of claim 3, wherein the feedback agent is a component of the hypervisor, wherein the one or more measures of physical utilization comprise at least one of a load on the CPU, a load on the network interface, an indication of cache contention, and an indication of memory bus utilization, wherein the one or more measures of virtual utilization comprise at least one of: (i) a load on a virtual CPU of the first virtual machine; (ii) a load on a virtual network interface of the first virtual machine; and (iii) a session count of the first virtual machine.

5. The computing system of claim 4, wherein an instance of the feedback agent executes on each of the plurality of virtual machines, wherein the instance of the feedback agent on a first of the plurality of virtual machines is configured to obtain the one or more measures of physical utilization by querying the hypervisor via one or more predefined application programming interface (API) calls.

6. The computing system of claim 5, wherein the one or more measures of virtual utilization include, in respective instances, the load on the virtual CPU, the load on the virtual network interface, and the session count.

7. The computing system of claim 6, wherein in a given instance, the one or more measures of virtual utilization include the load on the virtual CPU, the load on the virtualized network interface, and the session count;
wherein the one or more measures of hybrid utiliation are transmitted to the load balancer via a predefined protocol, wherein the predefined protocol comprises, in respective instances, dynamic feedback protocol (DFP) and keepalive appliance protocol (KALAP).

8. The computing system of claim 1, wherein an instance of the feedback agent executes on each of the plurality of virtual machines.

9. The computing system of claim 8, wherein the instance of the feedback agent on one of the plurality of virtual machines is configured to obtain the one or more measures of physical utilization by querying the hypervisor.

10. The computing system of claim 1, wherein the load balancer comprises a program executing on a second computing system, wherein the computing tasks comprise Internet Protocol (IP) network service requests, wherein the load balancer is configured to assign each request to a network connection on one of the virtual machines.

11. The computing system of claim 1, wherein the load balancer comprises a program executing on a second computing system, wherein the load balancer is further configured to monitor a migration of one of the virtual machines from the computing system to a target computing system and to selectively drop network traffic addressed to connections on the virtual machine while the virtual machine is migrated to the target computing system.

12. The computing system of claim 1, wherein the feedback agent is a component of the hypervisor.

13. The computing system of claim 1, wherein the one or more measures of physical utilization comprise at least one of a load on the CPU and a load on the network interface, an indication of cache contention, and an indication of memory bus utilization.

14. A computer-implemented method of using a feedback agent to in effect augment a capability of load balancing based on virtual utilization to additionally take into account physical utilization, without requiring any change to a load balancer application providing the capability, the computer-implemented method comprising:
generating one or more measures of virtual utilization by monitoring, by the feedback agent, one or more virtual hardware components of a first of the plurality of virtual machines, the one or more measures of virtual utilization including at least one of: (i) a load on a virtualized CPU of the first virtual machine and (ii) a load on a virtualized network interface of the first virtual machine;
generating one or more measures of physical utilization by monitoring one or more physical hardware components of a first computing system hosting the first virtual machine, wherein the one or more virtual hardware components are virtualized over the one or more physical hardware components;
generating one or more measures of hybrid utilization by operation of one or more computer processors and based on a predefined function including a weighted average of: (i) the one or more measures of physical utilization and (ii) the one or more measures of virtual utilization; and
transmitting the one or more measures of hybrid utilization via a network interface to the load balancer application, whereupon the load balancer application distributes computing tasks among the plurality of virtual machines based on the one or more measures of hybrid utilization and without requiring the load balancer application to have any capability of separately taking both physical and virtual utilization into account.

15. The computer-implemented method of claim 14, wherein the one or more measures of physical utilization comprise at least one of a load on a CPU and a load on the network interface.

16. The computer-implemented method of claim 15, wherein the instance of the feedback agent on one of the plurality of virtual machines is configured to obtain the one or more measures of physical utilization by querying the hypervisor.

17. The computer-implemented method of claim 14, wherein the load balancer application comprises a program executing on a second computing system, wherein the computing tasks comprise Internet Protocol (IP) network service requests, wherein the load balancer application is configured to:
assign each request to a network connection on one of the virtual machines;
monitor a migration of one of the virtual machines from the first computing system to a target computing system; and
selectively drop network traffic addressed to connections on the virtual machine being migrated during the migration.

18. The computer-implemented method of claim 14, wherein the feedback agent is a component of a hypervisor executing on the first computing system.

19. The computer-implemented method of claim 14, wherein an instance of the feedback agent executes on each of the plurality of virtual machines.

20. A non-transitory computer-readable medium containing a feedback agent executable to perform an operation to in effect augment a capability of load balancing based on virtual utilization to additionally take into account physical utilization, without requiring any change to a load balancer application providing the capability, the operation comprising:
   generating one or more measures of virtual utilization by monitoring, by the feedback agent, one or more virtual hardware components of a first of the plurality of virtual machines, the one or more measures of virtual utilization including at least one of: (i) a load on a virtualized CPU of the first virtual machine and (ii) a load on a virtualized network interface of the first virtual machine;
   generating one or more measures of physical utilization by monitoring one or more physical hardware components of a first computing system hosting the first virtual machine, wherein the one or more virtual hardware components are virtualized over the one or more physical hardware components;
   generating, by operation of one or more computer processors when executing the feedback agent, one or more measures of hybrid utilization reflecting both based on a predefined function including a weighted average of: (i) the one or more measures of physical utilization and (ii) the one or more measures of virtual utilization; and
   transmitting the one or more measures of hybrid utilization via a network interface to the load balancer application, whereupon the load balancer application distributes computing tasks among the plurality of virtual machines based on the one or more measures of hybrid utilization and without requiring the load balancer application to have any capability of separately taking both physical and virtual utilization into account.

21. The non-transitory computer-readable medium of claim 20, wherein an instance of the feedback agent executes on each of the plurality of virtual machines.

22. The non-transitory computer-readable medium of claim 21, wherein the instance of the feedback agent on one of the plurality of virtual machines is configured to obtain the one or more measures of physical utilization by querying the hypervisor.

23. The non-transitory computer-readable medium of claim 20, wherein the load balancer application comprises a program executing on a second computing system, wherein the computing tasks comprise Internet Protocol (IP) network service requests, wherein the load balancer application is configured to:
   assign each request to a network connection on one of the virtual machines;
   monitor a migration of one of the virtual machines from the first computing system to a target computing system; and
   selectively drop network traffic addressed to connections on the virtual machine being migrated during the migration.

24. The non-transitory computer-readable medium of claim 20, wherein the feedback agent is a component of a hypervisor executing on the first computing system.

25. The non-transitory computer-readable medium of claim 20, wherein the one or more measures of virtual utilization comprise at least one of a load on a virtual CPU and a load on a virtual network interface.

* * * * *

UNITED STATES PATENT AND TRADEMARK OFFICE
CERTIFICATE OF CORRECTION

PATENT NO. : 9,600,332 B2  
APPLICATION NO. : 12/431546  
DATED : March 21, 2017  
INVENTOR(S) : Alpesh S. Patel et al.

Page 1 of 1

It is certified that error appears in the above-identified patent and that said Letters Patent is hereby corrected as shown below:

On the Title Page

In item (54), in Column 1, in "Title", Line 3, after "FEEDBACK" insert -- AGENTS --.

In the Specification

In Column 1, Line 3, after "FEEDBACK" insert -- AGENTS --.

In Column 3, Line 7, delete "with out" and insert -- without --, therefor.

In the Claims

In Column 10, Line 58, in Claim 1, delete "incremented" and insert -- the --, therefor.

In Column 11, Line 40, in Claim 7, delete "utiliation" and insert -- utilization --, therefor.

In Column 11, Line 42, in Claim 7, delete "protool" and insert -- protocol --, therefor.

In Column 13, Line 27, in Claim 20, after "utilization" delete "reflecting both".

Signed and Sealed this  
Ninth Day of May, 2017

Michelle K. Lee  
*Director of the United States Patent and Trademark Office*